US011772569B2

(12) United States Patent
Huang

(10) Patent No.: US 11,772,569 B2
(45) Date of Patent: Oct. 3, 2023

(54) CARRYING RACK CONNECTING DEVICE

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 140 days.

(21) Appl. No.: 17/394,905

(22) Filed: Aug. 5, 2021

(65) Prior Publication Data

US 2023/0038546 A1 Feb. 9, 2023

(51) Int. Cl.
*B60R 9/06* (2006.01)
*F16B 2/20* (2006.01)

(52) U.S. Cl.
CPC . *B60R 9/06* (2013.01); *F16B 2/20* (2013.01)

(58) Field of Classification Search
CPC ..................................... B60R 9/06; F16B 2/20
USPC .......................................................... 224/519
See application file for complete search history.

(56) References Cited

U.S. PATENT DOCUMENTS

| | | | | |
|---|---|---|---|---|
| 5,244,133 A * | 9/1993 | Abbott | ...................... | B60R 9/10 224/532 |
| 5,333,888 A * | 8/1994 | Ball | ......................... | B60D 1/52 280/506 |
| 5,423,566 A * | 6/1995 | Warrington | ............... | B60R 9/06 224/532 |
| 6,835,021 B1 * | 12/2004 | McMillan | ................ | B60D 1/52 280/506 |
| 6,974,147 B1 * | 12/2005 | Kolda | ....................... | B60R 9/10 280/506 |
| 7,004,491 B1 * | 2/2006 | Allsop | ..................... | B60D 1/52 280/491.2 |
| 7,093,845 B1 * | 8/2006 | Fast | ......................... | B60D 1/50 280/511 |
| 8,596,664 B2 * | 12/2013 | Lahn | ...................... | B60D 1/241 280/495 |
| 8,696,011 B2 * | 4/2014 | Despres | ................... | B60D 1/52 280/495 |
| 8,833,791 B2 * | 9/2014 | Prescott | ................... | B60D 1/07 280/506 |

(Continued)

FOREIGN PATENT DOCUMENTS

TW M473345 U 3/2014

*Primary Examiner* — Peter N Helvey
(74) *Attorney, Agent, or Firm* — Muncy, Geissler, Olds & Lowe

(57) ABSTRACT

A carrying rack connecting device is provided, including: an insertion assembly, configured to be connected with a hitch; an urging mechanism, including a pin, a driving member and at least one urging member, the pin configured to pin the insertion assembly and the hitch, the driving member being connected to the insertion assembly and movable between a release position and an urging position, the driving member including an urging portion, the at least one urging member being swingably connected to the insertion assembly and including an urged portion, the urged portion and the urging portion partially overlapping, wherein when the driving member moves from the release position toward the urging position, the urging portion urges the urged portion to move the at least one urging member to swing outward so that the at least one urging member is urgingly abutted against the hitch.

9 Claims, 6 Drawing Sheets

(56) References Cited

U.S. PATENT DOCUMENTS

| | | | |
|---|---|---|---|
| 8,944,516 B2* | 2/2015 | Eidsmore | B60P 1/28 |
| | | | 280/506 |
| 9,376,063 B2* | 6/2016 | Hein | B60R 9/06 |
| 9,421,836 B1* | 8/2016 | Ford | B60D 1/30 |
| 9,663,040 B1* | 5/2017 | Shen | B60R 9/10 |
| 10,099,525 B1* | 10/2018 | Phillips | B60D 1/143 |
| 10,647,263 B2* | 5/2020 | Viklund | B60R 9/06 |
| 10,793,079 B1* | 10/2020 | Shen | B60D 1/241 |
| 11,208,052 B2* | 12/2021 | Shen | B60R 9/06 |
| 11,214,203 B2* | 1/2022 | Wang | B60R 9/10 |
| 11,465,458 B1* | 10/2022 | Dolinskiy | B60D 1/241 |
| 2009/0218789 A1* | 9/2009 | Beck | B60D 1/06 |
| | | | 280/515 |
| 2010/0283225 A1* | 11/2010 | Lahn | B60D 1/06 |
| | | | 280/506 |
| 2011/0089669 A1* | 4/2011 | Despres | B60D 1/52 |
| | | | 29/525.01 |
| 2012/0228852 A1* | 9/2012 | Bessette | B60D 1/241 |
| | | | 280/507 |
| 2014/0246467 A1* | 9/2014 | Hein | B60R 9/06 |
| | | | 224/400 |
| 2015/0083770 A1* | 3/2015 | Ziola | B60R 9/10 |
| | | | 224/501 |
| 2016/0096406 A1* | 4/2016 | Ford | B60D 1/24 |
| | | | 280/491.5 |
| 2021/0300257 A1* | 9/2021 | Shen | B60R 9/06 |
| 2022/0266936 A1* | 8/2022 | Foster | B60R 9/06 |

* cited by examiner

CARRYING RACK CONNECTING DEVICE

BACKGROUND OF THE INVENTION

Field of the Invention

The present invention relates to a carrying rack connecting device.

Description of the Prior Art

There are many types of carrying racks, so the ways they are combined with the vehicle are also different. In the common conventional way (disclosed in TW M473345, for example), a connecting rod of the carrying rack is connected with a mounting rod of the vehicle by insertion, and a connecting member is disposed through and connects the connecting rod and the mounting rod, such as the carrying frame structure.

However, in the conventional carrying rack, the connecting rod and the mounting rod cannot be stably connected because there is a gap between the connecting rod and the mounting rod. During moving of the vehicle, the adjusting member (such as a bolt) is wobbling relative to the connecting rod, resulting in deformation and wear of the adjusting member and resulting in enlargement of the through hole within which the adjusting member is disposed, due to collision of the adjusting member, the connecting rod and the mounting rod. As a result, the connection of the connecting rod and the mounting rod is unstable, the adjusting member can be damaged and is hard to mount/dismount, and/or the adjusting member might detach and causes danger.

The present invention is, therefore, arisen to obviate or at least mitigate the above-mentioned disadvantages.

SUMMARY OF THE INVENTION

The main object of the present invention is to provide a carrying rack connecting device which is easy to assemble and stable.

To achieve the above and other objects, a carrying rack connecting device is provided, including: an insertion assembly, configured to be connected with a hitch in an insertion direction; an urging mechanism, including a pin, a driving member and at least one urging member, the pin configured to pin the insertion assembly and the hitch in a direction lateral to the insertion direction, the driving member being connected to the insertion assembly and movable in the insertion direction between a release position and an urging position, the driving member including an urging portion, the at least one urging member being swingably connected to the insertion assembly, the at least one urging member including an urged portion, the urged portion and the urging portion partially overlapping in the insertion direction, wherein when the driving member moves from the release position toward the urging position, the urging portion urges the urged portion to move the at least one urging member to swing outward so that the at least one urging member is urgingly abutted against an inner face of the hitch.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
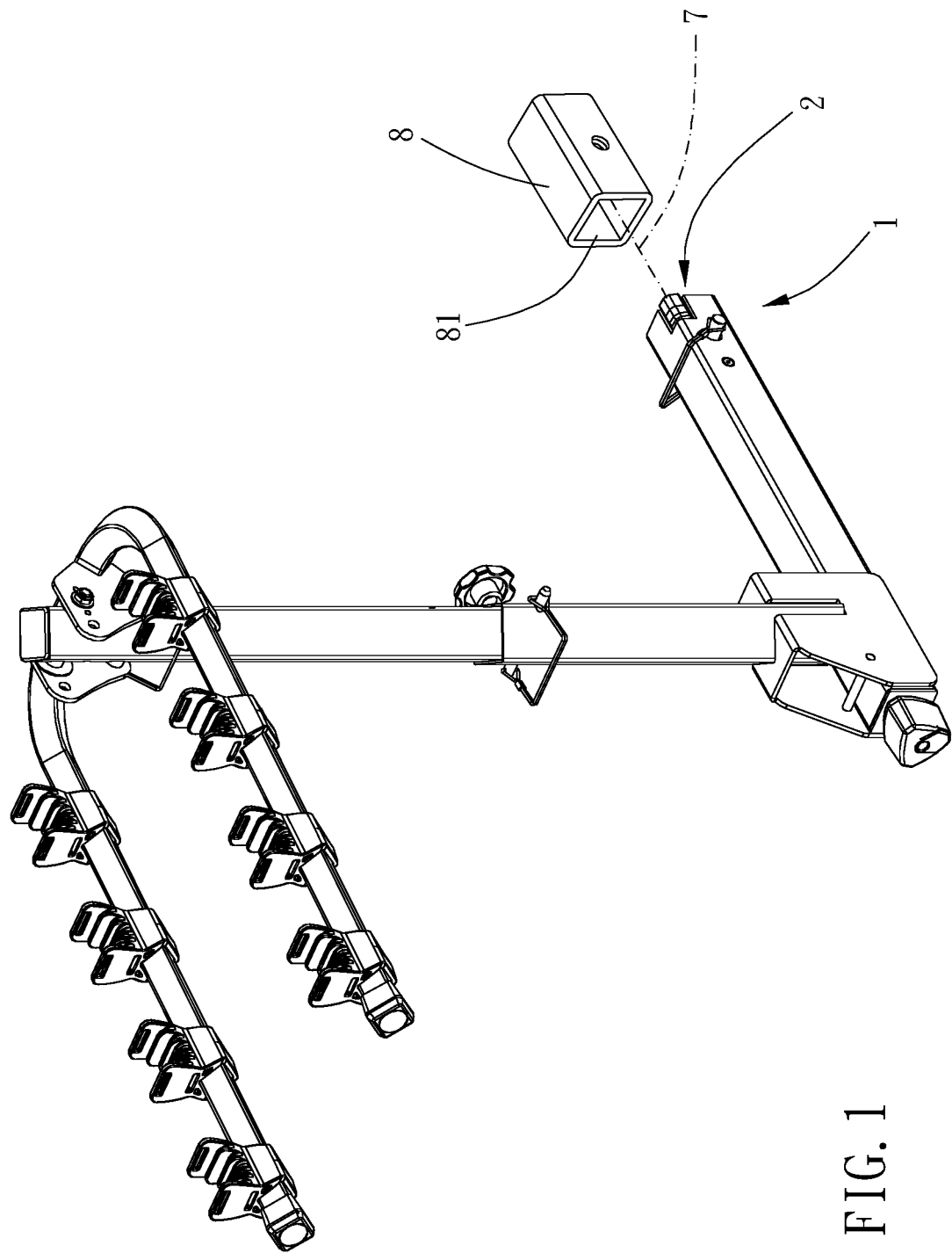
FIG. 1 is a stereogram showing application of a preferable embodiment of the present invention.
Figure 2:
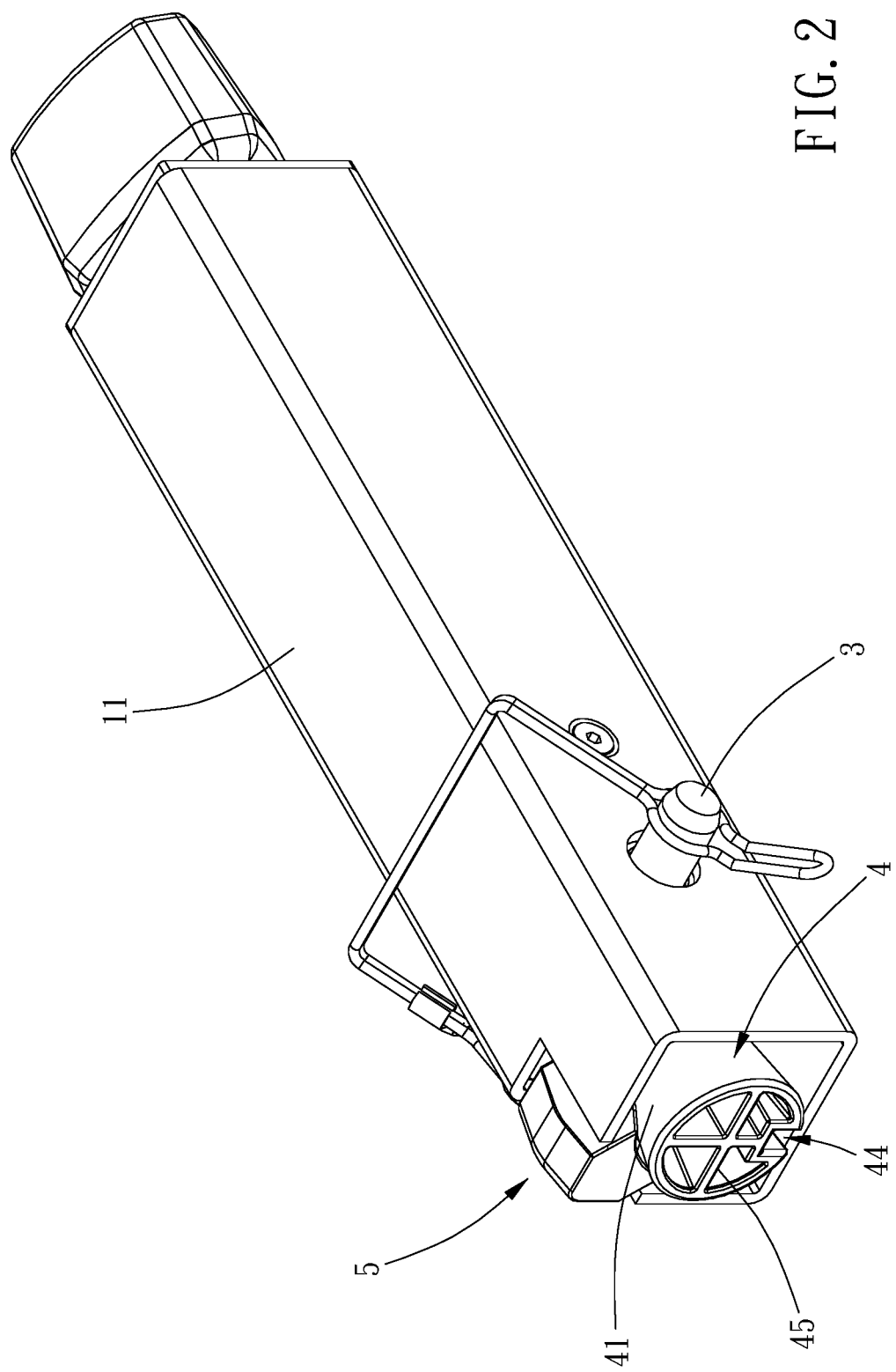
FIG. 2 is a stereogram of the preferable embodiment of the present invention.
Figure 3:
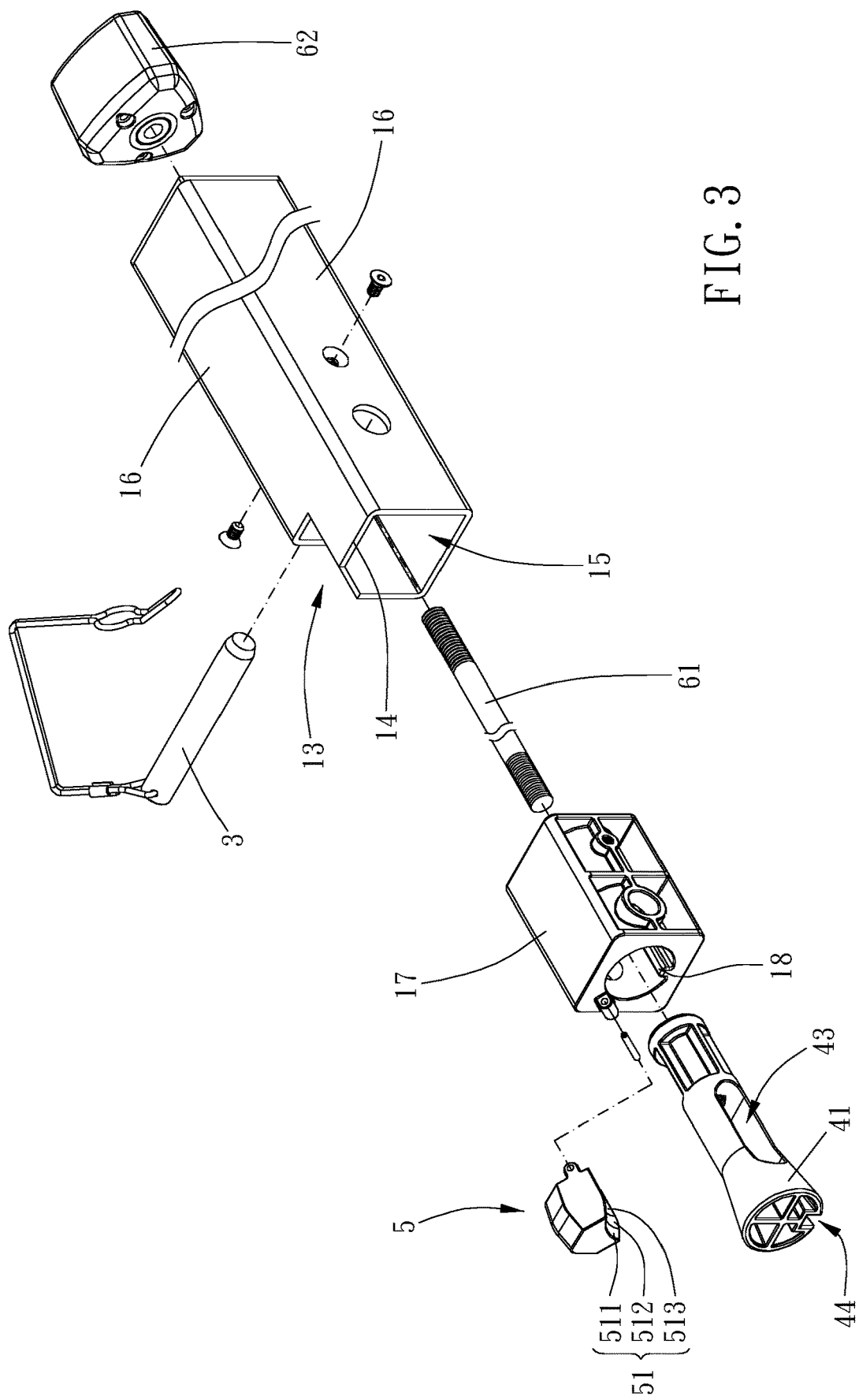
FIG. 3 is a breakdown drawing of FIG. 2.
Figure 4:
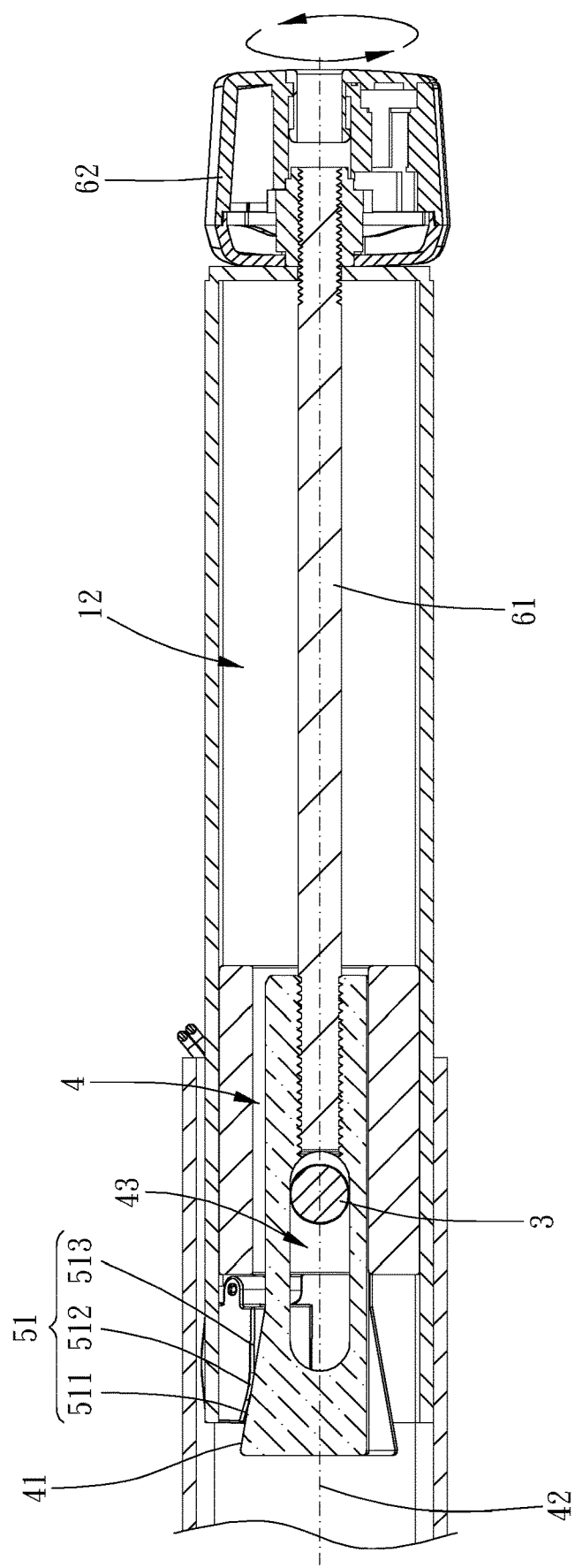
FIGS. 4 and 5 are drawings showing operation of the preferable embodiment of the present invention.
Figure 5:
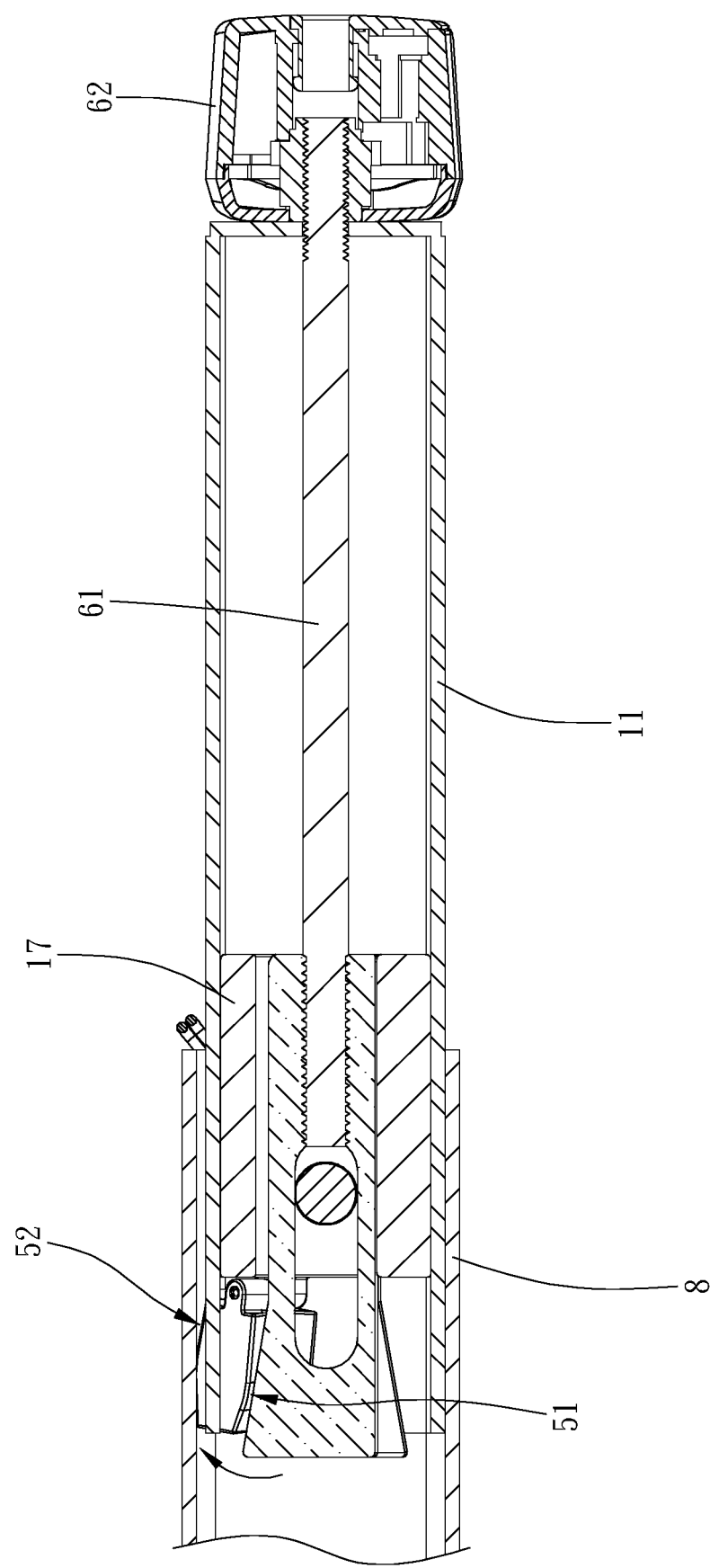
Figure 6:
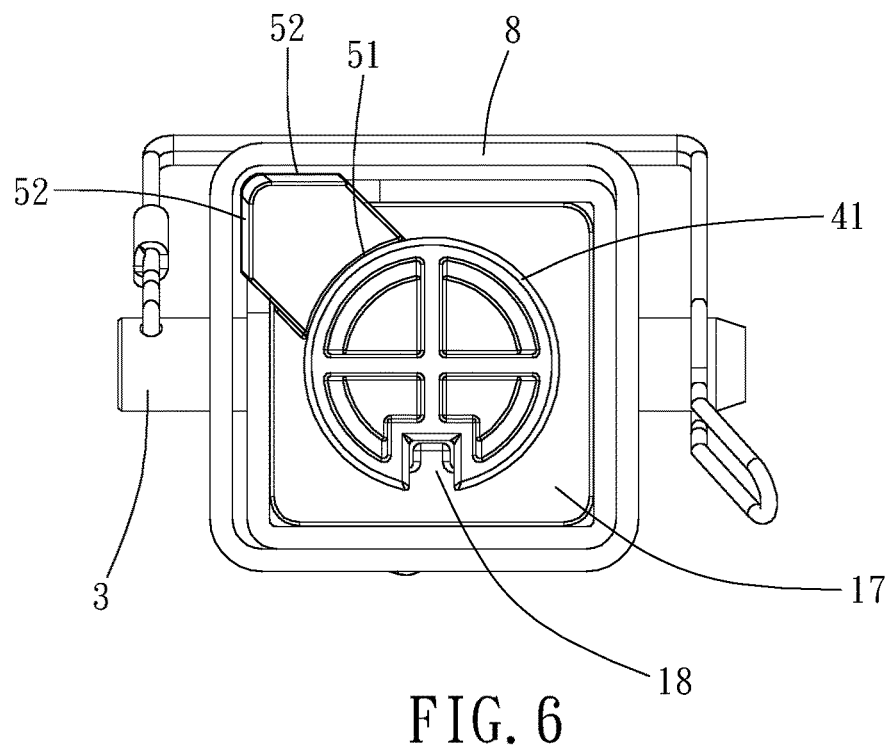
FIGS. 6 and 7 are drawings, in different view angle, showing operation of the preferable embodiment of the present invention.
Figure 7:
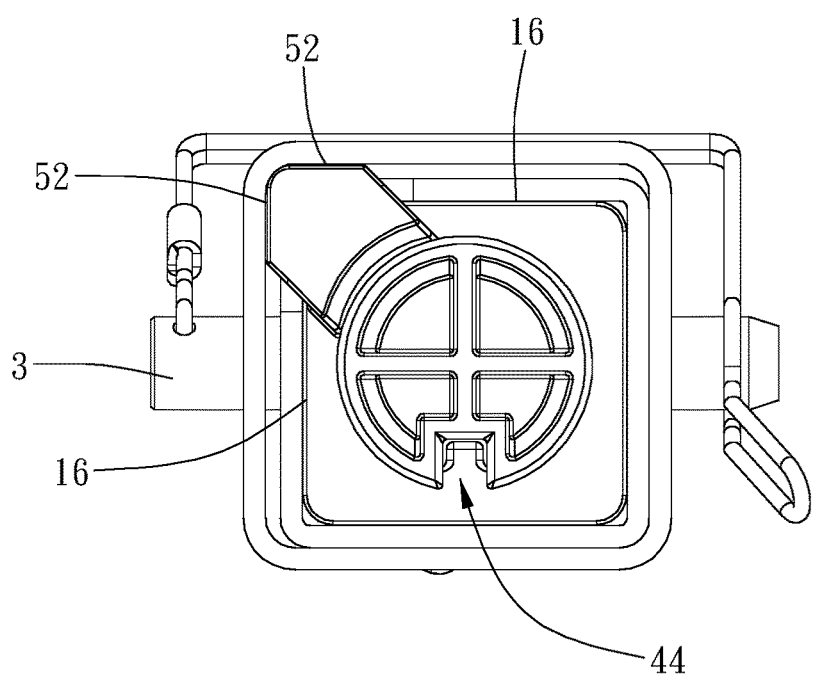

Please refer to FIGS. 1 to 7 for a preferable embodiment of the present invention. A carrying rack connecting device 1 of the present invention includes an insertion assembly 1 and an urging mechanism 2.

The insertion assembly 1 is configured to be connected with a hitch 8 in an insertion direction 7. The urging mechanism 2 includes a pin 3, a driving member 4, and at least one urging member 5. The pin 3 is configured to pin the insertion assembly 1 and the hitch 8 in a direction lateral to the insertion direction 7, which prevents the insertion assembly 1 from disengaging from the hitch 8. The driving member 4 is connected to the insertion assembly 1 and movable in the insertion direction 7 between a release position and an urging position. The driving member 4 includes an urging portion 41, the at least one urging member 5 is swingably connected to the insertion assembly 1, and the at least one urging member 5 includes an urged portion 51.

The urged portion 51 and the urging portion 41 partially overlap in the insertion direction 7. When the driving member 4 moves from the release position toward the urging position, the urging portion 41 urges the urged portion 51 to move the at least one urging member 5 to swing outward so that the at least one urging member 5 is urgingly abutted against an inner face 81 of the hitch 8, which can eliminates assembling gap between the insertion assembly 1 and the hitch 8, and improves assembling stability of the insertion assembly 1 and the hitch 8.

Specifically, the urging portion 41 is disposed around a central axis 42, and the urging portion 41 is tapered along the insertion direction 7 so that the urging portion 41 has different diametric dimensions relative to the central axis 42, which can be used for various hitches of different sizes. In this embodiment, the urging portion 41 is horn-shaped, and a plurality of ribs 45 are disposed inside the urging portion 41 to enforce the structural strength of the urging portion 41.

The insertion assembly 1 includes a main body 11 and a positioning member 17, the main body 11 extends along the insertion direction 7 and defines an interior space 12, the positioning member 17 is positioned within the interior space 12, and the main body 11 includes at least one via hole 13 in communication with the interior space 12. The at least one urging member 5 is swingably connected to the positioning member 17 and corresponds to the at least one via hole 13. When the driving member 4 moves to the urging position, the at least one urging member 5 is swingable to be protrusive beyond the main body 11 so as to abut against the inner face 81 of the hitch 8.

Specifically, the main body 11 further includes an end face 14 and an end opening 15 defined by the end face, the end opening 15 is in communication with the interior space 12, the end opening 15 is open toward the insertion direction 7, and the at least one via hole 13 extends from the end face 14 in the insertion direction 7, which facilitates flexible assembling of the at least one urging member 5 without changing the size of the at least one via hole 13.

Specifically, the main body 11 is a rectangular tubular member, and the via hole 13 is disposed on a corner portion of the main body 11 and extends between two side walls 16 of the main body 11. The urging member 5 includes two pressing portions 52 connected with the urged portion 51, the two pressing portions 52 and the urged portion 51 are located at opposing sides of the at least one urging member 5, and the two pressing portions 52 correspond to the two side walls 16 and are projectable beyond the main body 11, respectively. That is, the urging member 5 can urge the hitch 8 in two different directions so that the main body 11 is not easy to sway (vertically and horizontally, for example) relative to the hitch 8.

In this embodiment, since each of the two pressing portions 52 is V-shaped, the pressing portion 52 can stably abut the hitch 8. The urged portion 51 includes a first inclined surface 511, a connection surface 512 and a second inclined surface 513 connected in sequence along the insertion direction 7. The connection surface 512 is abutted against the urging portion 41, the first inclined surface 511 and the second inclined surface 513 extend away from the urging portion 41, the urged portion 51 is V-shaped, which reduces frictional resistance between the urged portion 51 and the urging portion 41 so that the urging member 5 is swingable outward quickly.

Preferably, the driving member 4 includes a through hole 43, the through hole 43 extends along the insertion direction 7, and the pin 3 is disposed through the through hole 43 and pins the insertion assembly 1 and the hitch 8. Through cooperation of the pin 3 and the through hole 43, the driving member 4 is restricted to be only slidable in the insertion direction 7, and the driving member 4 is stably slidable.

Preferably, one of the insertion assembly 1 and the driving member 4 includes a recess 44, the other of the insertion assembly 1 and the driving member 4 includes a projection 18, at least one of the projection 18 and the recess 44 extends along the insertion direction 7, and the projection 18 is slidably engageable within the recess 44 so that the driving member 4 is restricted to be only slidable in the insertion direction 7, which provides good stability of the driving member 4.

In this embodiment, the positioning member 17 includes the projection 18, and the driving member 4 includes the recess 44. The urging mechanism 2 further includes a threaded rod 61 and a knob 62, the threaded rod 61 rotatably is disposed through the insertion assembly 1, the threaded rod 61 is rotatably screwed with the driving member 4, and the threaded rod 61 is connected and rotatable with the knob 62, in which the driving member 4 can be moved linearly by rotating the knob 62.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A carrying rack connecting device, including:
    an insertion assembly, configured to be connected with a hitch in an insertion direction; and
    an urging mechanism, including a pin, a driving member and at least one urging member, the pin configured to pin the insertion assembly and the hitch in a direction lateral to the insertion direction, the driving member being connected to the insertion assembly and movable in the insertion direction between a release position and an urging position, the driving member including an urging portion, the at least one urging member being swingably connected to the insertion assembly, the at least one urging member including an urged portion, the urged portion and the urging portion partially overlapping in the insertion direction, wherein when the driving member moves from the release position toward the urging position, the urging portion urges the urged portion to move the at least one urging member to swing outward so that the at least one urging member is urgingly abutted against an inner face of the hitch;
    wherein the insertion assembly includes a main body and a positioning member, the main body extends along the insertion direction and defines an interior space, the positioning member is positioned within the interior space, the main body includes at least one via hole in communication with the interior space, and the at least one urging member is swingably connected to the positioning member and corresponds to the at least one via hole so that the at least one urging member is swingable to be protrusive beyond the main body so as to abut against the inner face of the hitch.

2. The carrying rack connecting device of claim 1, wherein the main body further includes an end face and an end opening defined by the end face, the end opening is in communication with the interior space, the end opening is open toward the insertion direction, and the at least one via hole extends from the end face in the insertion direction.

3. The carrying rack connecting device of claim 1, wherein the main body is a rectangular tubular member, and the via hole is disposed on a corner portion of the main body and extends between two side walls of the main body.

4. The carrying rack connecting device of claim 3, wherein the at least one urging member includes two pressing portions connected with the urged portion, the two pressing portions and the urged portion are located at opposing sides of the at least one urging member, and the two pressing portions correspond to the two side walls and are projectable beyond the main body, respectively.

5. The carrying rack connecting device of claim 1, wherein the driving member includes a through hole, the through hole extends along the insertion direction, and the pin is disposed through the through hole and pins the insertion assembly and the hitch.

6. The carrying rack connecting device of claim 1, wherein one of the insertion assembly and the driving member includes a recess, the other of the insertion assembly and the driving member includes a projection, at least one of the projection and the recess extends along the insertion direction, and the projection is slidably engageable within the recess so that the driving member is restricted to be only slidable in the insertion direction.

7. The carrying rack connecting device of claim 6, wherein the urging mechanism further includes a threaded rod and a knob, the threaded rod rotatably is disposed through the insertion assembly, the threaded rod is rotatably screwed with the driving member, and the threaded rod is connected and rotatable with the knob.

8. The carrying rack connecting device of claim 1, wherein the urging portion is disposed around a central axis, and the urging portion is tapered along the insertion direction so that the urging portion has different diametric dimensions relative to the central axis.

9. The carrying rack connecting device of claim 4, wherein the main body further includes an end face and an end opening defined by the end opening, the end opening is in communication with the interior space, the end opening is open toward the insertion direction, and the at least one via hole extends from the end face in the insertion direction; the driving member includes a through hole, the through hole extends along the insertion direction, and the pin is disposed through the through hole and pin the insertion assembly and the hitch; one of the insertion assembly and the driving member includes a recess, the other of the insertion assembly and the driving member includes a projection, at least one of the projection and the recess extends along the insertion direction, and the projection is slidably engageable within the recess so that the driving member is restricted to be only slidable in the insertion direction; the urging mechanism further includes a threaded rod and a knob, the threaded rod rotatably is disposed through the insertion assembly, the threaded rod is rotatably screwed with the driving member, and the threaded rod is connected and rotatable with the knob; the urging portion is disposed around a central axis, the urging portion is tapered along the insertion direction so that the urging portion has different diametric dimensions relative to the central axis; each of the two pressing portions is V-shaped; the urged portion includes a first inclined surface, a connection surface and a second inclined surface connected in sequence along the insertion direction, the connection surface is abutted against the urging portion, the first inclined surface and the second inclined surface extend away from the urging portion, the urged portion is V-shaped; the urging portion is horn-shaped, and a plurality of ribs are disposed inside the urging portion; the positioning member includes the projection, and the driving member includes the recess.

\* \* \* \* \*